(12) United States Patent
Ikeda et al.

(10) Patent No.: US 8,456,714 B2
(45) Date of Patent: Jun. 4, 2013

(54) IMAGE FORMING APPARATUS

(75) Inventors: Yasuhiko Ikeda, Sagamihara (JP); Haruyuki Yanagi, Machida (JP); Masaaki Ishibashi, Hino (JP); Kenichi Nishimura, Tokyo (JP); Sakiko Takizawa, Tokyo (JP); Naofumi Sekine, Kawasaki (JP); Hiroshi Ogushi, Shiroi (JP); Takeji Niikura, Yokohama (JP); Tetsuya Saito, Yokohama (JP); Tetsuhiro Nitta, Yokohama (JP); Shigeyuki Sugiyama, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 331 days.

(21) Appl. No.: 12/579,265

(22) Filed: Oct. 14, 2009

(65) Prior Publication Data

US 2010/0097667 A1 Apr. 22, 2010

(30) Foreign Application Priority Data

Oct. 16, 2008 (JP) ................................. 2008-267073

(51) Int. Cl.
*H04N 1/04* (2006.01)
(52) U.S. Cl.
USPC ............ 358/474; 358/497; 358/498; 358/492

(58) Field of Classification Search
USPC .......................... 358/474, 497, 498, 492, 506
See application file for complete search history.

(56) References Cited

U.S. PATENT DOCUMENTS

| 6,661,539 | B1 * | 12/2003 | Nee | 358/474 |
| 7,126,726 | B2 * | 10/2006 | Takei et al. | 358/474 |
| 2004/0165232 | A1 * | 8/2004 | Chiba et al. | 358/498 |

FOREIGN PATENT DOCUMENTS

| JP | 2003-134285 | * | 5/2003 |
| JP | 2003-134285 A | | 5/2003 |
| JP | 2006-093759 A | | 4/2006 |

* cited by examiner

*Primary Examiner* — Houshang Safaipour
(74) *Attorney, Agent, or Firm* — Canon USA Inc IP Division

(57) ABSTRACT

An image forming apparatus includes a printing section, a flatbed scanner section configured to read an original on a reading surface, and a moving mechanism configured to change the angle of the reading surface relative to an installation plane on which the apparatus is installed. The scanner section is capable of performing reading in each of a first mode where the angle of the reading surface is a first angle (vertical) and a second mode where the angle of the reading surface is a second angle (horizontal) different from the first angle.

14 Claims, 6 Drawing Sheets

IMAGE FORMING APPARATUS

BACKGROUND OF THE INVENTION

1. Field of the Invention

The present invention relates to an image forming apparatus including a flatbed scanner.

2. Description of the Related Art

Flatbed scanners each have a reading surface made of, for example, a glass plate to read an original placed on the reading surface. Such type scanners are highly user-convenient because the scanners can support a variety of originals, including a thin original, such as a sheet type original, and a thick original, such as a book. The size of the reading surface has to be equal to or larger than the size of an original at minimum. Accordingly, the miniaturization of such a scanner, in particular, a reduction in footprint of the scanner is seriously limited. Some attempts have been made to solve the above-described problem.

Japanese Patent Laid-Open No. 2003-134285 discloses an image forming apparatus including a mechanism in which a reading surface is placed vertically (in a vertical posture) while a scanner is not used and the reading surface is shifted to a horizontal posture before the scanner is used in order to reduce the footprint of the apparatus while the scanner is not used.

In the apparatus disclosed in Japanese Patent Laid-Open No. 2003-134285, although the footprint of the apparatus can be reduced while the apparatus is not used, the apparatus has to need a large footprint at all times while being used because the reading surface is placed horizontally during usage of the apparatus.

SUMMARY OF THE INVENTION

The present invention has been made in consideration of requests for reduction in footprint as much as possible. The present invention provides an image forming apparatus whose form is appropriately changed in accordance with a target original to reduce the footprint of the apparatus as much as possible upon usage of the apparatus, thus achieving a high-level balance between miniaturization and ease of use.

According to an aspect of the present invention, an image forming apparatus includes a storage section configured to store media, a printing section configured to perform printing on a medium supplied from the storage section, a flatbed scanner section, having a reading surface, configured to read an original on the reading surface, and a moving mechanism configured to move the reading surface to change the angle of the reading surface relative to an installation plane on which the apparatus is installed, wherein the scanner section is capable of holding the original on the reading surface to read the original in each of a first mode where the angle of the reading surface is a first angle and a second mode where the angle of the reading surface is a second angle different from the first angle.

Further features of the present invention will become apparent from the following description of exemplary embodiments with reference to the attached drawings.

DESCRIPTION OF THE EMBODIMENTS

Exemplary preferred embodiments of the present invention will be described below with reference to the drawings. Components which will be described in the following embodiments are intended to be illustrated and are not intended to restrict the scope of the invention.

A multifunction machine including an inkjet printer and a scanner, namely, a multifunction peripheral will be described below as an example of an image forming apparatus. The present invention is also applicable to an image forming apparatus that does not include a printer and includes a flatbed scanner alone. In the present specification, sheet type print media, such as a sheet of paper, a plastic sheet, and a film will be called "media".

Figure 1:
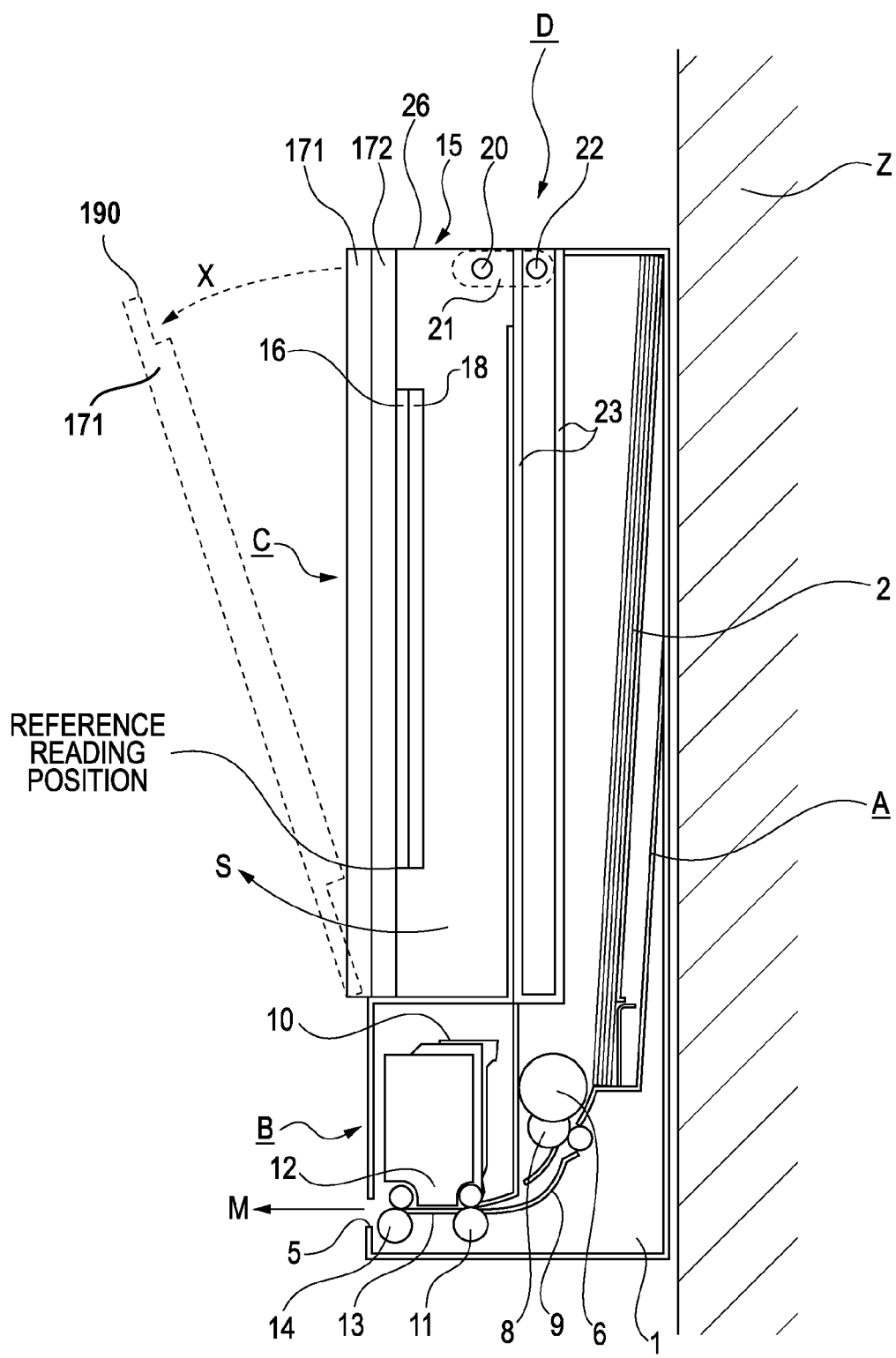
FIG. 1 is a cross-sectional view of the internal structure of an apparatus according to an embodiment of the present invention.
Figure 2:
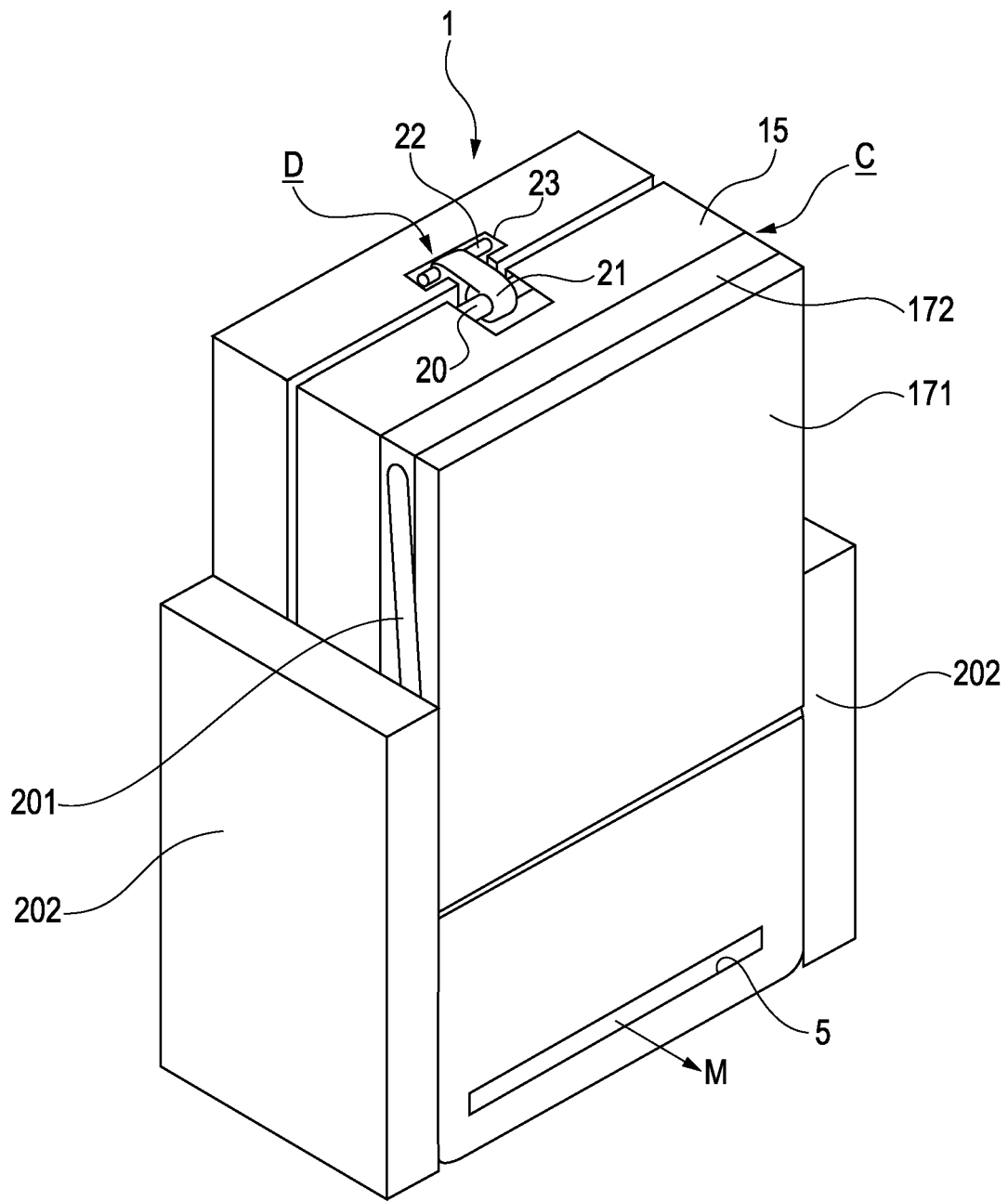
FIG. 2 is a perspective view of the apparatus.

FIG. 1 is a cross-sectional view of the internal structure of an apparatus according to an embodiment of the present invention. FIG. 2 is a perspective view of the apparatus.

This apparatus is of wall-mounted type. The apparatus is installed such that a main body 1 (hereinafter, referred to as an "apparatus main body 1") of the apparatus is hung on a hook attached to a substantially vertical (vertical or generally vertical) wall (installation plane Z for the apparatus), e.g., a wall in a room. While being hung on the wall, the rear surface of the apparatus main body is fixed to the installation plane Z such that the main body is in contact with the plane. The apparatus is positioned on the installation plane Z.

Broadly speaking, the apparatus includes a storage section A for storing media, a printing section B for forming a print image on a medium, and a flatbed scanner section C for reading an original on a reading surface to form an electronic image.

Media 2 are vertically stacked in the storage section A in the apparatus main body 1. Vertically storing the media permits a reduction in footprint (floor-projected area) of the apparatus. Furthermore, since the printing section B is positioned lower than the storage section A, a medium 2 is smoothly conveyed downward under its own weight.

In the present embodiment, it is assumed that cut sheets of up to B4 size at maximum are used. The surface of each of the media 2 stacked in the storage section A is substantially parallel (parallel or generally parallel) to the installation plane Z. The uppermost one of the media 2 is in contact with a separation roller 6 which separates only the medium 2 in contact therewith. The medium is fed to the printing section B along a guide 9 by a feeding roller unit 8. The medium is moved at a constant speed by a conveying roller unit 11.

In the printing section B, a recording head 12 mounted on a carriage 10 ejects ink toward the medium 2 conveyed over a platen 13, thus forming a two-dimensional print image. Various inkjet methods, e.g., a method using a heating element, a method using a piezoelectric element, a method using an electrostatic element, and a method using a micro-electromechanical system (MEMS) element are available. The printed medium 2 is discharged from an eject portion 5 by a discharging roller unit 14 in the direction shown by the arrow M.

The scanner section C includes a flatbed scanner 15 that reads image information of an original placed on the reading surface, indicated at 16, made of a transparent glass plate through a sensor unit 18. Since the scanner 15 is of the flatbed type on which an original is placed, the scanner 15 can read a variety of originals, e.g., a sheet original and thick book-like originals such as a book. The glass plate, serving as the reading surface 16, is supported by a frame 26 that serves as a chassis of the flatbed scanner 15.

A cover 171 and a cover 172 are plates which can be opened relative to the reading surface 16 and the frame 26 supporting the reading surface 16 by a user and which hold an original placed on the reading surface 16 by pressing into contact therewith. The cover 171 is a plate that blocks light. The cover 171 has a protruding face that protrudes toward the cover 172 within a range covering at least the reading surface 16. The protruding face presses an original against the reading surface 16. The cover 171 has a first edge 190 and a second edge 191, with the second edge 191 being located on an opposite side of the cover 171 relative the first edge 190. The cover 172 has a through hole within a range covering at least the reading surface 16, the hole having a size equal to or larger than that of the above-described protruding face. When the cover 171 is superposed on the cover 172, the protruding face is fitted into the hole. Instead of forming a hole in the cover 172, the cover 172 may be a thin transparent glass plate.

The cover 171 is singly openable relative to the frame 26 and the cover 172 in the direction shown by the arrow X in FIG. 1 using the lower side in the vertical direction (direction of gravity) as a hinge (first hinge). In addition, while the cover 171 is being superposed on the cover 172 such that the covers are substantially integrated with each other, the cover 172 and the cover 171 are openable relative to the frame 26 through a hinge (second hinge) provided for the upper side of the cover 172 in the vertical direction.

The cover 171 and the cover 172 are coupled to each other by an arm 201, as shown in FIG. 2. A restricting member 202 constitutes a lock mechanism that restricts movement of the arm 201 to lock the cover 172 so as to prevent the cover 172 from being opened (namely, to lock opening of the cover 172). In a state shown in FIG. 2, the restricting member 202 locks the movement of the arm 201. Since the arm 201 does not affect opening of the cover 171, the cover 171 is openable. To open the cover 172, however, it is necessary to rotate the arm 201. In this state where the arm 201 is locked, the cover 172 cannot be opened.

The sensor unit 18 is a contact type image sensor. The sensor unit 18 includes a light source that illuminates an original from the inside of the reading surface 16, a cylindrical lens array that converges light reflected from the original, and a line sensor including an array of photo detectors. An optical system of the sensor unit 18 has such a depth of field that, even if the optical path length up to the surface of an original to be read varies, the original can be read with sufficient contrast without being out of focus. The sensor unit 18 has a length enough to cover the width of the reading surface 16. While being moved at a constant speed under the reading surface 16 by a mechanism including a motor as a driving source, the sensor unit 18 reads a two-dimensional image to form an electronic image.

Figure 3:
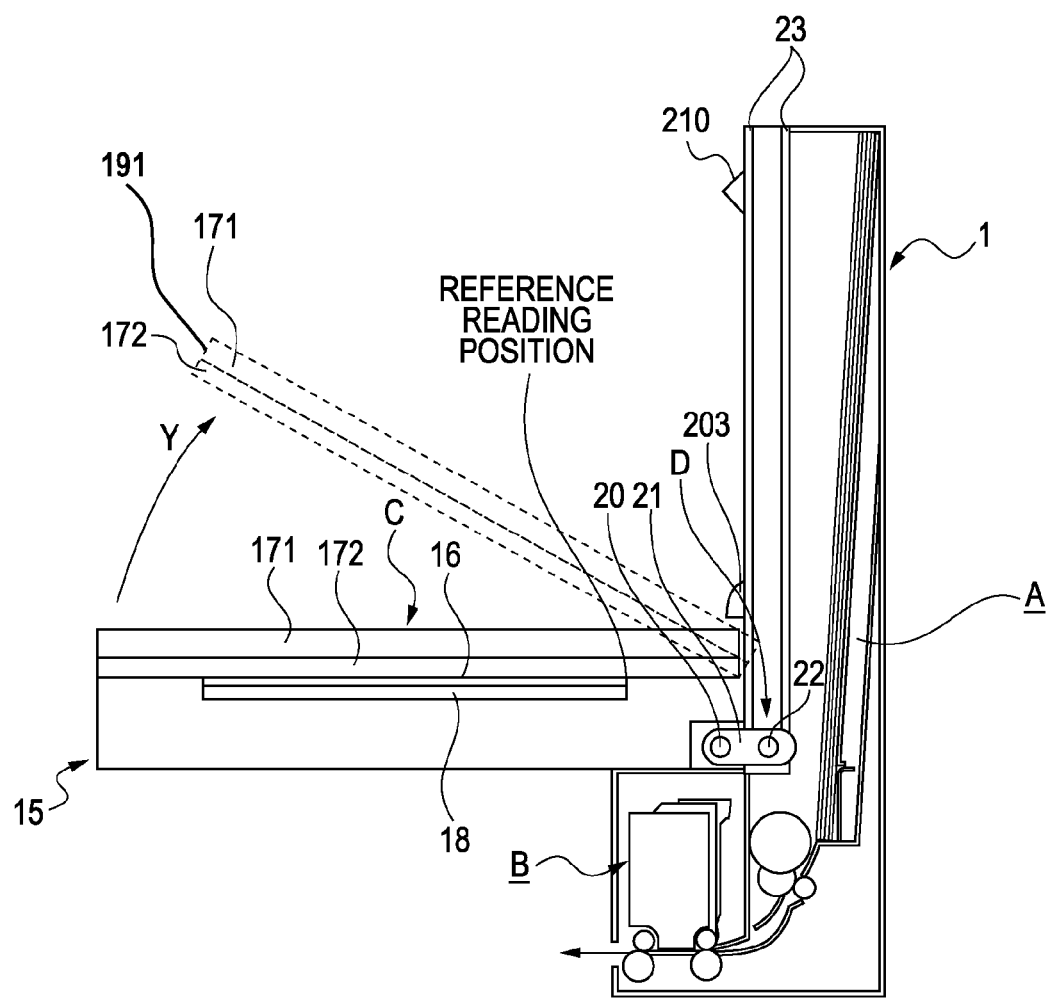
FIG. 3 is a diagram illustrating the internal structure of the apparatus in a second mode.

The scanner section C can change the angle and position of the reading surface 16 relative to the installation plane Z between two modes. In a first mode, as shown in FIG. 1, the reading surface 16 is located in a first position at a first angle such that the reading surface 16 is placed in substantially the vertical direction (i.e., vertically or generally vertically). In a second mode, as shown in FIG. 3, the reading surface 16 is located in a second position at a second angle different from the first angle such that the reading surface 16 is placed in substantially the horizontal direction (i.e., horizontally or generally horizontally). In the first mode, the reading surface 16 is substantially parallel (i.e., parallel or generally parallel) to the surfaces of the media 2 stacked in the storage section A. In the second mode, the reading surface 16 is substantially perpendicular (i.e., perpendicular or generally perpendicular) to the surfaces of the media 2.

A moving mechanism D is a mode switching mechanism that moves the reading surface 16 as described above to change the angle and position of the reading surface 16 relative to the installation plane Z. The moving mechanism D includes a shaft 20 and a supporting member 21. The shaft 20 is fixed in the vicinity of the central portion of the upper end of the flatbed scanner 15 in the vertical direction. The supporting member 21 rotatably supports the shaft 20 in one end thereof. Accordingly, the flatbed scanner 15 is rotatable about the shaft 20 in the direction shown by the arrow S in FIG. 1. The supporting member 21 has a projection 22 in the other end thereof. In addition, the surface of the apparatus main body 1 facing the flatbed scanner 15 has a guide rail 23, serving as a straight groove. The projection 22 is vertically slidable along the guide rail 23 while being engaged with the groove of the guide rail 23. In other words, the guide rail 23 guides one end (close to the shaft 20) of the frame 26 constituting the scanner section C so that the one end of the frame 26 is moved in the direction substantially parallel to the installation plane Z.

Furthermore, a sensor 210 is provided for the surface of the apparatus main body 1 facing the flatbed scanner 15. The sensor 210 detects the posture of the flatbed scanner 15, namely, a vertical posture or a horizontal posture to determine whether the scanner section C is in the first mode or the second mode. A controller of the apparatus permits a reading operation using any of the vertices of the rectangular reading surface 16 as a reference reading position (used to determine a reading area of a predetermined size) in accordance with the mode detected by the sensor 210.

FIG. 1 illustrates a state in which the scanner section C is in the first mode (where the reading surface 16 is vertically placed). The first mode is selected mainly to read a thin sheet original. As previously described, the cover 172 cannot be opened because the arm 201 is locked by the restricting member 202.

The user opens the cover 171 so as to move the cover 171 in the direction shown by the arrow X in FIG. 1 through the hinge (first hinge) provided for the cover 171 and then inserts an original from above. In the first mode, the first edge 190 of the cover 171 is separate from the reading surface 16 when the cover 171 is moved in the direction shown by the arrow X. The user aligns a corner in the leading end of the inserted original with the reference reading position at the lower corner of the reading surface 16 in the vertical direction. In this state, the user closes the cover 171 so that the original is held between the protruding face of the cover 171 and the reading surface 16. Since the reference reading position is located under the inserted original, the alignment of the original with the reference reading position on the reading surface 16 can be easily achieved.

The controller of the apparatus starts a reading operation in response to an operation on a scan button by the user as a trigger. The controller detects the first mode through the above-described sensor 210 and sets a proper reference reading position in accordance with the detected mode. The sensor unit 18 scans an area, corresponding to an original size previously input to the apparatus, using the set reference reading position as a reference point to read the original.

FIG. 3 illustrates a state after the moving mechanism D moves the flatbed scanner 15 of the scanner section C to switch the scanner section C from the first mode to the second mode (where the reading surface 16 is horizontally placed). To perform this mode switching, in the state shown in FIG. 1, the flatbed scanner 15 is rotated about the shaft 20 in the direction S by 90 degrees and the projection 22 of the supporting member 21 is then slid to the lowermost position along the guide rail 23. To switch the scanner section C from the second mode to the first mode, the above operation is reversed. Specifically, to switch the scanner section C between the first and second modes, one end (where the shaft 20 is placed) of the frame 26 constituting the scanner section C is moved in the direction substantially parallel to the installation plane Z by the moving mechanism D. The other end (corresponding to the side opposite the side where the shaft 20 is placed of the rectangular face of the frame 26 facing the installation plane Z) of the frame 26 is moved so as to describe an arc and is then linearly moved, so that the other end is moved in the direction substantially perpendicular to the installation plane Z. Consequently, the reading surface 16 of the scanner section C is switched between the first mode where the reading surface 16 faces away from the wall and the second mode where the reading surface 16 faces upward in the vertical direction.

The second mode is selected mainly to read a thick original such as a book. As shown in FIG. 3, the user opens the superposed covers 171 and 172 together in the direction shown by the arrow Y and then places an original on the reading surface 16. In the second mode, the second edge 191 of the cover 171 is separate from the reading surface 16 when the superposed covers 171 and 172 are moved in the direction shown by the arrow Y. The cover 171 and the cover 172 can be regarded as a substantially single plate (plate assembly) because the protruding face of the cover 171 is fitted in the hole of the cover 172. A restricting member 203 projects to the left in FIG. 3 because the member is urged by a spring. The restricting member 203 does not obstruct a path for switching between the first mode and the second mode. Even when the user tries to open the cover 171 in the second mode, the restricting member 203 obstructs the opening of the cover 171 alone. Accordingly, the superposed covers 172 and 171 are permitted to be opened together in the direction shown by the arrow Y.

The user aligns a corner of the original with a reference reading position located at a back corner of the reading surface 16. The reading reference position in FIG. 3 differs from that in FIG. 1. The reason is as follows. The hinge (second hinge) of the cover 172 is located at the back of the scanner section C (the side of the cover 172 close to the installation plane Z) in FIG. 3. When the reference reading position is also located at the back of the scanner section C, an original is easily aligned with the reference reading position. In particular, to scan one page of a book in which each double-page spread exceeds the reading surface 16, an unnecessary portion may be protruded frontward. Accordingly, there is a good deal of merit in setting a reference reading position at the back of the scanner section C.

The controller of the apparatus starts a reading operation in response to an operation on the scan button by the user as a trigger. The controller detects the second mode through the above-described sensor 210 and sets a reference reading position appropriate to the detected second mode. The sensor unit 18 scans an area, corresponding to an original size previously input to the apparatus, using the set reference reading position as a reference point to read the original.

The hinge mechanism of the cover 172 has much play so as to support a thick original. If an original is so thick that the cover 172 cannot be closed, the user may press the original so that the surface of the original is brought into tight contact with the reading surface 16 in order to perform a reading operation while the cover 172 is being opened.

As described above, to read a thin sheet original, the apparatus is switched into the first mode to minimize the footprint of the apparatus. Whereas, to read a thick original, the apparatus is switched into the second mode so that the original is easily held.

In addition, since the hinge used for opening the cover (or integrated covers) is changed in accordance with the mode so that the cover is opened in the optimum direction, the ease of use is good. Furthermore, since the lock mechanism is provided so that only the appropriate side of either of the two covers is opened in accordance with the mode, the user can operate the apparatus without hesitation. Furthermore, the reference reading position in the reading surface is changed in accordance with the mode. Accordingly, since an original can be easily set in any mode, the ease of use is good.

Modifications

Some modifications will be described below.

Figure 4:
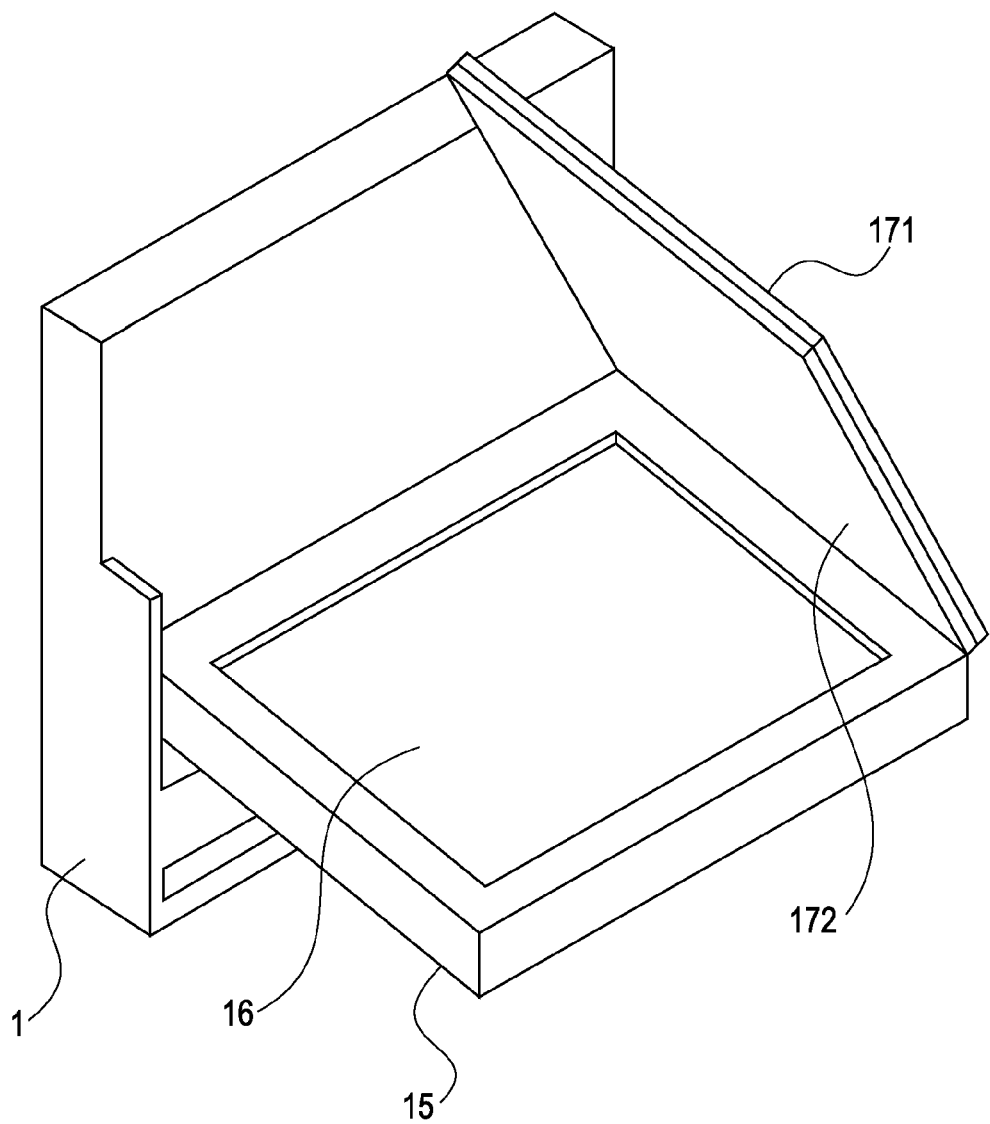
FIG. 4 is a schematic diagram illustrating an apparatus according to a first modification of the embodiment of the present invention, the apparatus being in the second mode.

FIG. 4 is a schematic diagram illustrating a first modification of the above-described embodiment of the present invention. According to this modification, the position of the hinge of the cover 172 in the second mode is different from that in the above-described embodiment. The hinge (second hinge) of the cover 172 is placed not at the back of the cover 172, as shown in FIG. 3, but at the side thereof so that the cover is opened to the side. The position of the hinge (first hinge) used for opening the cover 171 in the first mode is the same as that in the foregoing embodiment.

Figure 5:
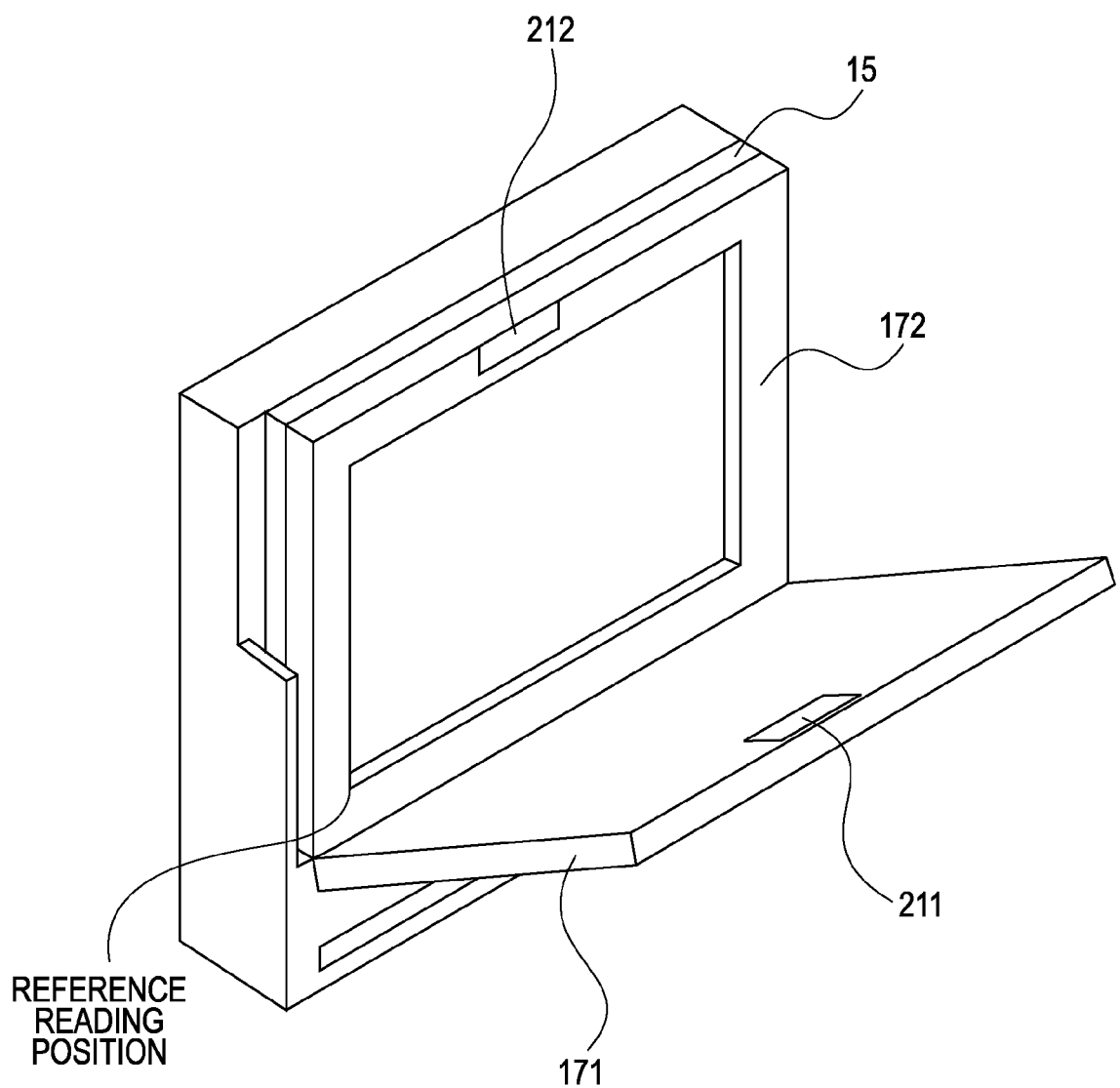
FIG. 5 is a schematic diagram illustrating an apparatus according to a second modification, the apparatus being in a first mode.
Figure 6:
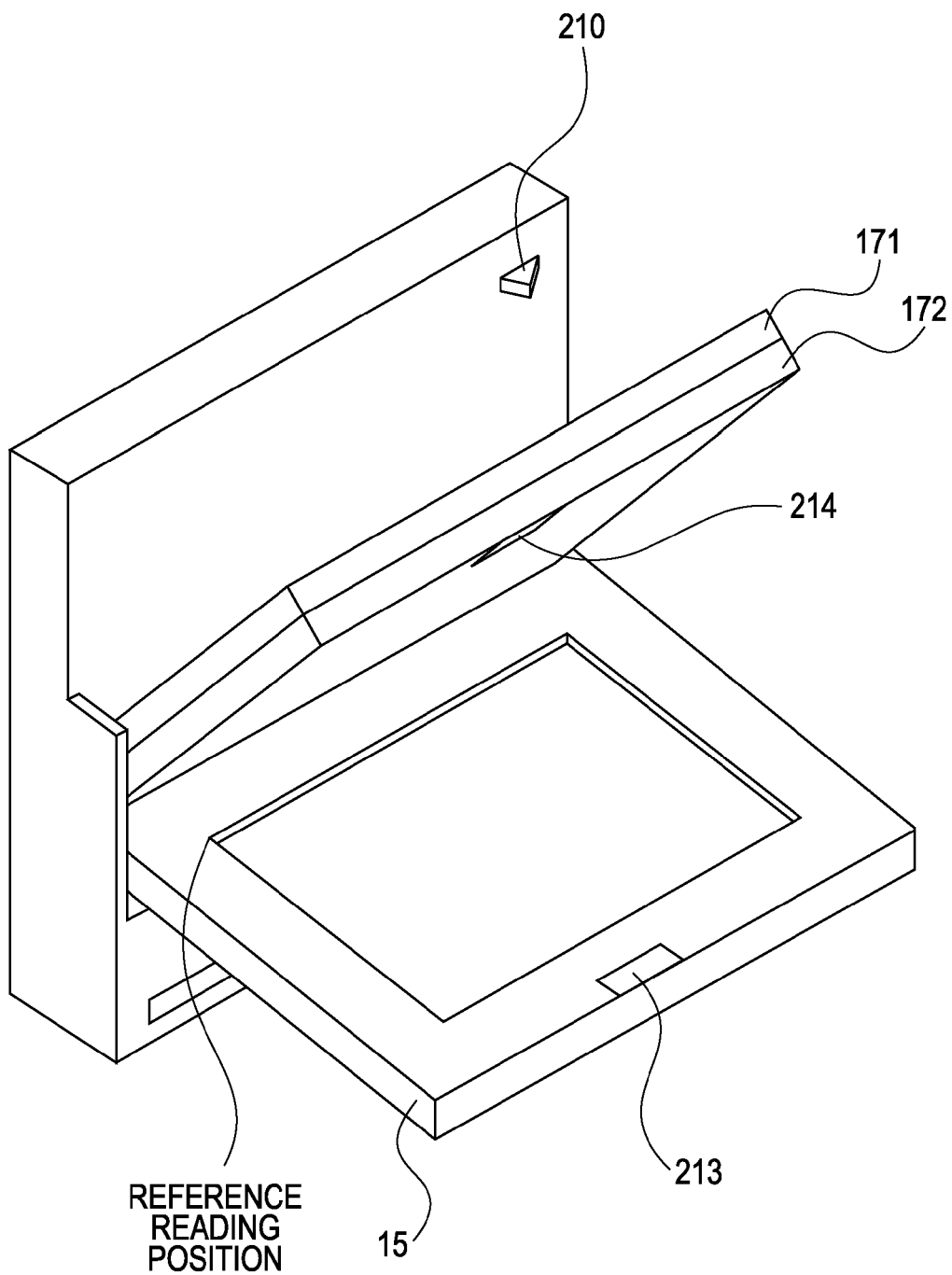
FIG. 6 is a schematic diagram illustrating the apparatus according to the second modification, the apparatus being in the second mode.

FIGS. 5 and 6 are schematic diagrams illustrating a second modification in which a lock mechanism using electromagnets is provided. FIG. 5 illustrates a state of an apparatus in the first mode. FIG. 6 illustrates a state of the apparatus in the second mode.

Referring to FIG. 5, a metal plate 211 provided for the cover 171 is paired with an electromagnet 212 provided for the cover 172, thus constituting a first lock mechanism. When the lock mechanism is allowed to function, the electromagnet 212 generates a magnetic force by energization, so that the electromagnet 212 attracts the metal plate 211 to lock the cover 171. Thus, the cover 171 cannot be opened relative to the cover 172.

Referring to FIG. 6, a metal plate 213 provided for the flatbed scanner 15 is paired with an electromagnet 214 provided for the cover 172, thus constituting a second lock mechanism. When the lock mechanism is allowed to function, the electromagnet 214 generates a magnetic force by energization, so that the electromagnet 214 attracts the metal plate 213 to lock the cover 172. Thus, the cover 172 cannot be opened relative to the flatbed scanner 15. To determine whether the apparatus is in the first mode or the second mode, whether the flatbed scanner 15 is in the vertical posture or the horizontal posture is detected by the sensor 210 in a manner similar to the foregoing embodiment.

In the first mode shown in FIG. 5, the controller allows the second lock mechanism to function and releases the first lock mechanism so that only the cover 171 is openable. Whereas, in the second mode in FIG. 6, the controller allows the first lock mechanism to function and releases the second lock mechanism so that the integrated covers 172 and 171 are openable. In addition, the controller makes the reference reading position different between the first mode and the second mode to perform a reading operation in a manner similar to the foregoing embodiment.

In any of the above-described embodiment and modifications, the reading mode of the apparatus is appropriately changed in accordance with a target original. An original can be read while the footprint of the apparatus is reduced when not needed. In addition, the footprint of the apparatus can be reduced when not in use. Accordingly, the image forming apparatus achieving a high-level balance between miniaturization and ease of use can be provided.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-267073 filed Oct. 16, 2008, which is hereby incorporated by reference herein in its entirety.

What is claimed is:

1. An image forming apparatus comprising:
 a storage section configured to store media;
 a printing section configured to perform printing on a medium supplied from the storage section;
 a flatbed scanner section, having a reading surface, configured to read an original on the reading surface; and
 a changing mechanism configured to change the angle of the reading surface relative to the printing section,
 wherein the flatbed scanner section is capable of reading the original on the reading surface in each of a first mode where the angle of the reading surface is a first angle relative to the printing section and a second mode where the angle of the reading surface is a second angle relative to the printing section different from the first angle,
 wherein the flatbed scanner section includes an openable cover for covering the reading surface entirely, the openable cover being configured to press the original on the reading surface;
 wherein the openable cover is openable on a first hinge in the first mode;
 wherein the openable cover is openable on a second hinge in the second mode, and
 wherein the first hinge and the second hinge are arranged near two different edges of the openable cover.

2. The apparatus according to claim 1, wherein the first angle is an angle at which the reading surface is substantially parallel to an installation plane on which the apparatus is installed and the second angle is an angle at which the reading surface is substantially perpendicular to the installation plane.

3. The apparatus according to claim 2, wherein the installation plane is a substantially vertical wall and the apparatus is hung on the wall.

4. The apparatus according to claim 3, wherein the reading surface of the scanner section faces away from the installation plane in the first mode and faces upward in the vertical direction in the second mode.

5. The apparatus according to claim 2, wherein upon switching between the first mode and the second mode, the changing mechanism allows one end of a frame constituting the scanner section to move in a direction substantially parallel to the installation plane and allows the other end of the frame to move in a direction substantially perpendicular to the installation plane.

6. The apparatus according to claim 5, wherein the changing mechanism includes a guide rail configured to guide the one end of the frame constituting the scanner section for movement in the direction substantially parallel to the installation plane.

7. The apparatus according to claim 1, wherein the cover includes two plates, one of the two plates is opened and closed in the first mode and the two plates are opened and closed in the second mode while being integrated with each other.

8. The apparatus according to claim 1, wherein a reference reading position in the reading surface is made different between the first mode and the second mode to perform reading.

9. The apparatus according to claim 1, further comprising:
 a unit configured to detect whether the apparatus is in the first mode or the second mode.

10. The apparatus according to claim 2, wherein the media are stacked in the storage section so as to be substantially parallel to the installation plane.

11. The apparatus according to claim 1, wherein the printing section performs inkjet printing.

12. A scanner apparatus comprising:
 a flatbed scanner section, having a reading surface, configured to read an original on the reading surface; and
 a changing mechanism configured to move the reading surface to change the angle of the reading surface relative to a body of the apparatus wherein the flatbed scanner section is capable of reading the original on the reading surface in each of a first mode where the angle of the reading surface is a first angle relative to the apparatus body and a second mode where the angle of the reading surface is a second angle relative to the apparatus body different from the first angle,
 wherein the flatbed scanner section includes an openable cover for covering the reading surface entirely, the openable cover being configured to press the original on the reading surface;
 wherein the openable cover is openable on a first hinge in the first mode;
 wherein the openable cover is openable on a second hinge in the second mode; and
 wherein the first hinge and the second hinge are arranged near two different edges of the openable cover.

13. The apparatus according to claim 12, wherein the first hinge is disposed near a first edge of the openable cover, and the second hinge is disposed near a second edge of the openable cover opposite to the first edge.

14. The apparatus according to claim 1, wherein the first hinge is disposed near a first edge of the openable cover, and the second hinge is disposed near a second edge of the openable cover opposite to the first edge.

* * * * *